Jan. 2, 1934.  J. P. SHANKLIN  1,942,262
METHOD FOR DETERMINING LOCATION IN PROGRESS OVER A GIVEN AREA
Filed March 22, 1933  2 Sheets-Sheet 1

John P. Shanklin
INVENTOR
BY Victor J. Evans & Co.
ATTORNEYS

Jan. 2, 1934.  J. P. SHANKLIN  1,942,262
METHOD FOR DETERMINING LOCATION IN PROGRESS OVER A GIVEN AREA
Filed March 22, 1933   2 Sheets-Sheet 2

John P. Shanklin
INVENTOR

BY Victor J. Evans & Co.
ATTORNEYS

Patented Jan. 2, 1934

1,942,262

UNITED STATES PATENT OFFICE 1,942,262

METHOD FOR DETERMINING LOCATION IN PROGRESS OVER A GIVEN AREA

John P. Shanklin, Marion, Va.

Application March 22, 1933. Serial No. 662,180

7 Claims. (Cl. 250—11)

The object of the invention is to provide a method for so dividing a given area into certain defined zones by projecting over the area a series of standing waves that the location of a body in transit through said area may be determined by the reception and comparison of said waves.

With this object in view, the method comprises the employment of certain conventional apparatus and their use in such a way as to provide a network of standing waves which may be graphically recorded in any acceptable manner as disclosed in the accompanying drawings and following specification.

Utilizing the phenomenon of standing waves which it is possible to secure from remotely positioned synchronized transmitters, the improved method contemplates the laying down or projecting of a series of such waves either from two transmitters positioned respectively at two points between which it is desired to travel, or laying down or projecting a network of standing waves from different pairs of transmitters arranged in angularly related planes. While the method is possible of application in progress over land, it is designed particularly for use in air or water navigation and if transit is between two fixed points, it is necessary only to position transmitters at those points, indicated in Figure 2 by the stations 10 and 11 respectively. Each of the stations contains the usual transmitting equipment discharging from an antenna 12. But the plan does not contemplate the use of merely one length of wave but rather dual lengths of waves of slightly different frequencies. By well known means, dual frequencies may be transmitted by the one transmitter, but in order that the two transmitters may be in complete synchronism to produce the desired standing waves, they are coupled to harmonic amplifiers such as indicated at 14 and the two amplifiers are interconnected by a conductor 15 interposed in which is an oscillator 16.

Figure 1:
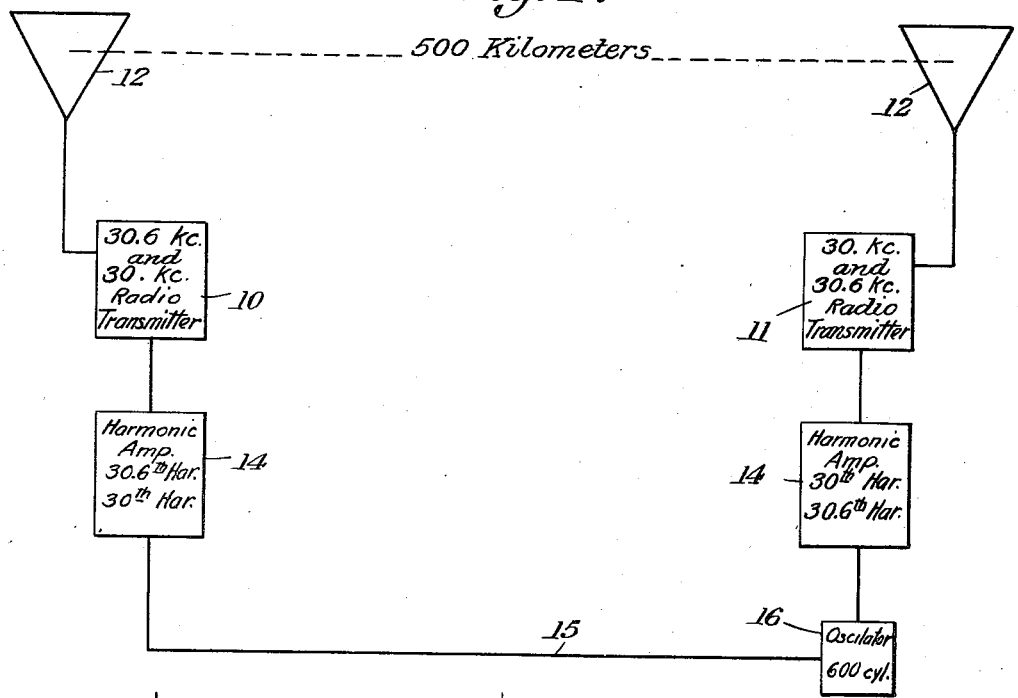
Figure 1 is a graphic illustration of remotely positioned transmitter stations projecting waves of the same frequency and synchronized to provide successive standing waves.
Figure 2:
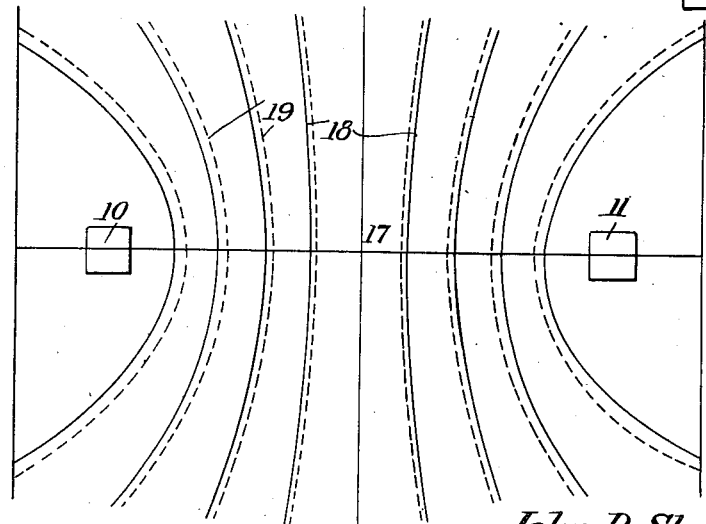
Figure 2 is a graphic illustration of the standing waves produced by such stations.

The method may be best understood by assuming a definite distance between the stations 10 and 11, say 500 kilometers. On such a distance between stations, wave lengths of 10,000 meters and 9803.9 meters may be employed for the two different wave lengths transmitted by each transmitter. On the basis of 500 kilometers distance between stations, the 10,000 meter wave would provide fifty wave lengths between stations or one hundred standing waves. For the shorter wave length of 9803.9 meters, there would be fifty-one wave lengths between stations or one hundred and two standing waves. The 10,000 meter wave having a frequency of 30 kilocycles and the 9803.9 meter wave having a frequency of 30.6 kilocycles, the amplifiers 14 would be of harmonics of these frequencies and the coupling oscillator 16 of .6 of a kilocycle or 600 cycles. On this basis the zero voltages of the different frequencies will be in step at the midpoint 17 between the stations 10 and 11 while the zero voltages will be out of step approximately 196 meters on each standing wave on either side of the midpoint 17, twice this amount for the next standing wave on either side and so on to the transmitters, as indicated in Figure 2 by the full lines 18 and broken lines 19, the former indicating the standing waves of the 30 kilocycle frequency and the latter the standing waves of the 30.6 kilocycle frequency. If progress between the stations 10 and 11 be in the vertical plane of the stations, or in a straight line between the two (and this may be accomplished by the use of a radio compass or equivalent means) and it can be determined which of the standing waves is being crossed by the means of transit, the exact location between the stations can be determined. The method therefore is susceptible of application by recording the standing waves graphically by means of receivers, indicated diagrammatically at 20 and 21, the former for one frequency, say, the 30 kilocycle frequency, and the latter for the other frequency. The receivers, of course, incorporate amplifiers so that they may actuate their respective styli 22 and 23, these being disposed above a moving tape or chart 24 on which are inscribed the straight lines 25 and 26 intended to be the lines of zero voltage of the waves. Since the receivers are carried by the means of transit, if the chart 24 be moving in timed relation with said means and be so positioned laterally with respect to the styli that when the receivers cross the zero points of the standing waves, the styli will fall on the lines 25 and 26, the progress of the means of transit will result in progressively crossing the standing waves from zero voltage to maximum voltage which will be reflected in the movement of the styli 22 and 23 through the instrumentality of receivers 20 and 21. Thus a graphic representation of the standing waves will be made on the chart 24 appearing as the curves 27 and 28. Since at the midpoint 17 between the stations, zero voltages of the two different frequencies are in step, the points representing these on the chart 24 will fall in a common transverse line 29 and each succeeding zero point of the higher frequency will fall in a transverse line on the chart back of the transverse line representing the zero point of the lower frequency in a harmonic progression on either side of the point where the zero voltages of the two frequencies are in step.

On the assumed distances between stations and the assumed frequencies, the higher frequency wave is of a length 196 meters less than the lower frequency wave, so that the first wave of the higher frequency to either side of the midpoint 17 between stations will have its zero point displaced 196 meters from the zero point of the corresponding wave of the lower frequency. The next succeeding waves will have their corresponding zero points displaced twice this amount, the next, three times and so on. Thus in the zone 30 of the chart the distance between the points 31 and 32 will represent an actual distance of 196 meters, the distance between the points 33 and 34 a distance of 392 meters. Thus, if means, such as proportional dividers, be used to reduce the distances between the points 31 and 32 and 33 and 34 and the other corresponding points on the chart to readable amounts, as by reference to a prearranged scale, the particular position of the means of transit between the stations 10 and 11 can be definitely determined, even if the receivers 21 and 22 are operated only at times when it is desired to ascertain the location. Of course, reference to a translating chart as above suggested is not necessary if a continuous record is made on the chart during progress between stations, because it is definitely known how many standing waves exist and the counting of the number recorded of either frequency will immediately determine the location.

By having the standing waves fall into step at midpoint between the stations, either at their peak or zero voltages indicates when the midpoint in the journey has been reached; and whether the zero points of the higher frequency occur before or after the zero points of the lower frequency will determine in which half of the journey the means of transit is located.

Figure 3:
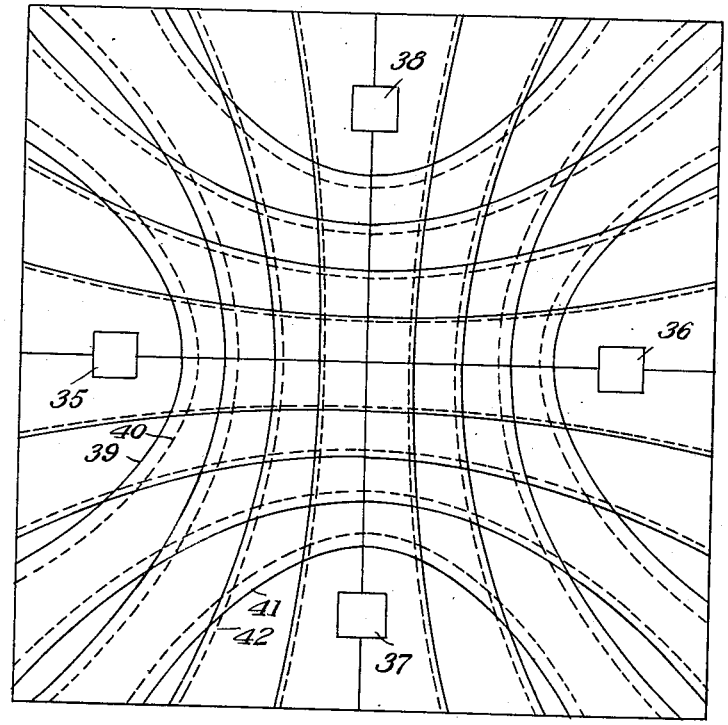
Figure 3 is a graphic illustration of the standing waves produced by two pairs of such stations of which the respective pairs are disposed in angularly related vertical planes.
Figure 4:
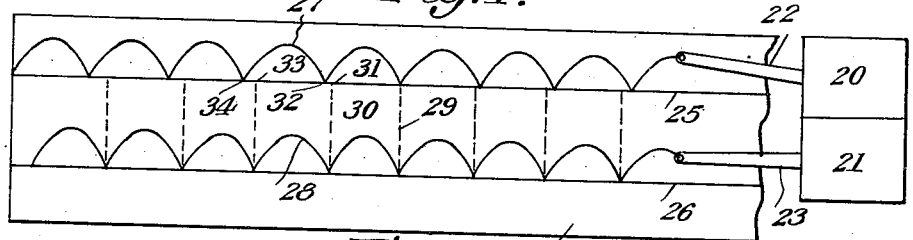
Figure 4 is a diagrammatic view of the method of recording such waves, showing the form of the record when the direction of translation is directly across the waves.
Figure 5:
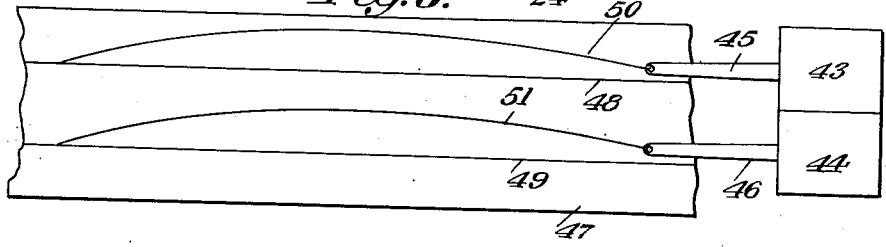
Figure 5 is a view similar to Figure 4 but showing the form of record obtained when the direction of translation is transverse to the direction of propagation of such waves.

But the method is susceptible of application without the necessity for having to keep the means of transit in a line or parallel to a line between the transmitting stations, for a second set of stations may be arranged transverse to the first to cover a defined area, as that defined by the stations 35, 36, 37 and 38. The stations 35 and 36 will transmit dual synchronized waves of differing frequencies, as in the case of stations 10 and 11, while stations 37 and 38 will transmit dual synchronized waves also of frequencies differing from each other and differing from the frequencies transmitted by the stations 35 and 36. The standing waves set up by the stations 35—36 are graphically indicated by the full lines 39 and broken lines 40, while the standing waves set up by the stations 37—38 are graphically indicated by the full lines 41 and broken lines 42. The means of transit in moving in the general direction of the stations 35 and 36 will record the standing waves due to those stations in the same general manner as shown in Figure 4. But it will also record the standing waves due to the stations 37—38 and for this purpose must carry receivers 43 and 44 whose styli 45 and 46 traverse a chart 47 on the zero lines 48 and 49 on which it traces curves which will be of the general form of the curves 50 and 51 if the direction of movement of the means of transit be from the station 35 to 36 but laterally of the vertical plane of the two. If the direction of transit be diagonal, so as to be intermediate between the stations 35 and 37, the graphs traced by the several styli will be of a shape depending on the direction in which the means of transit crosses the various standing waves and by proper comparison of the several graphs traced, it may be definitely determined in what zone the means of transit is located at the time of observation and calculation, the crossing standing waves dividing the area by which they are embraced into specifically related zones, as indicated in Figure 3 by the lines 39, 40, 41 and 42.

Instead of recording the standing waves, as above proposed, the instantaneous voltages of the different frequencies may be indicated on indicating meters and the position determined by the out-of-phase relation of the differing but related frequencies at the time of making a reading.

The invention having been described, what is claimed as new and useful is:

1. A method for determining location in progress over a given area which comprises projection a network of radio standing waves over such area, then graphically recording a sinusoidal line defining the peak and zero voltages of said waves, and finally determining position in said area by counting the number of said waves recorded between the points of departure and arrival.

2. A method for determining location in progress over a given area which comprises projecting a network of radio standing waves over such area graphically recording a sinusoidal line defining the peak and zero voltages of said waves while maintaining a definite position along or laterally of the common vertical plane of the points of projection of said waves, and finally determining position in said area by counting the number of waves recorded between the points of departure and arrival.

3. A method for determining location in progress over a given area which comprises projecting a network of radio standing waves over such area in a duality of sets of slightly differing frequencies, then graphically recording sinusoidal lines defining the peak and zero voltages of the waves of each frequency, and finally determining position in said area from the indicated zero points of two waves at the time of the calculation.

4. A method for determining location in progress over a given area which comprises projecting from diametrically opposite sides of said area and in angularly related vertical planes synchronized radio waves to provide a network of angularly related standing waves, then charting curved lines defining the instant voltages of the crossing waves, and finally determining position in said area by comparison of the charted lines of which one will represent movement in the direction of the plane of one wave and the other movement laterally toward or away from said plane.

5. A method for determining location in progress over a given area which comprises projecting from diametrically opposite sides of said area and in angularly related vertical planes synchronized radio waves in pairs of slightly differing frequencies of which the frequencies of one pair differ from those of the other pair to provide a network of angularly related standing waves, then charting curved lines defining the instant voltages of the waves of each frequency, and finally determining position in said area by comparison of the charted lines of which one will represent movement in the direction of the plane of one pair of waves and the other movement laterally toward or away from said plane.

6. A method for determining location in progress over a given area which comprises projecting a network of radio standing waves over such area in a duality of slightly differing frequencies, then indicating the instantaneous voltages of the waves of each frequency, and finally determining position in said area by the out-of-phase relation of the zero voltages of the two waves at the time of the calculation.

7. A method for determining location in progress over a given area which comprises projecting a network of radio standing waves over said area in a plurality of angularly related pairs of which the waves of each pair slightly differ in frequency and also differ in frequency from the waves of any other pair, then indicating the instantaneous voltages of the waves of each frequency, and finally determining position in said area by the out-of-phase relation of the zero voltages of the several waves at the time of the calculation.

JOHN P. SHANKLIN.